US009027327B2

(12) United States Patent
Johnson et al.

(10) Patent No.: US 9,027,327 B2
(45) Date of Patent: May 12, 2015

(54) METHOD AND SYSTEM FOR REGENERATING AN EXHAUST GAS PURIFICATION UNIT

(75) Inventors: Niclas Johnson, Billdal (SE); Marcus Steen, Angered (SE); Frank Dennis Langervik, Greensboro, NC (US); Paulina Ramfelt, Askim (SE)

(73) Assignee: Volvo Lasivagnar AB, Göteborg (SE)

( * ) Notice: Subject to any disclaimer, the term of this patent is extended or adjusted under 35 U.S.C. 154(b) by 131 days.

(21) Appl. No.: 12/761,517

(22) Filed: Apr. 16, 2010

(65) Prior Publication Data

US 2010/0313551 A1    Dec. 16, 2010

Related U.S. Application Data

(63) Continuation of application No. 12/304,759, filed as application No. PCT/SE2006/000730 on Jun. 14, 2006, now abandoned.

(51) Int. Cl.
*F01N 3/023* (2006.01)
*F01N 9/00* (2006.01)
*F02D 41/02* (2006.01)

(52) U.S. Cl.
CPC ............. *F01N 3/023* (2013.01); *F01N 9/002* (2013.01); *F01N 2570/10* (2013.01); *Y02T 10/47* (2013.01); *F02D 2041/026* (2013.01)

(58) Field of Classification Search
CPC .................................. F02D 2041/026
USPC .......................... 60/295, 297, 310
See application file for complete search history.

(56) References Cited

U.S. PATENT DOCUMENTS

| 2,166,099 | A | 7/1939 | Quartullo | |
| 6,422,001 | B1 * | 7/2002 | Sherman et al. | 60/274 |
| 6,550,449 | B2 | 4/2003 | Akazaki et al. | |
| 6,568,177 | B1 | 5/2003 | Surnilla | |
| 2003/0145582 | A1 * | 8/2003 | Bunting et al. | 60/297 |
| 2004/0172935 | A1 | 9/2004 | Otake et al. | |
| 2005/0148430 | A1 | 7/2005 | Graupner et al. | |

(Continued)

FOREIGN PATENT DOCUMENTS

| EP | 1437492 A1 | 7/2004 |
| FR | 2831208 A1 | 4/2003 |
| FR | 2822900 A1 | 10/2004 |

(Continued)

OTHER PUBLICATIONS

International Search Report for corresponding International Application PCT/SE2006/000730.
Supplementary European Search Report Feb. 10, 2015 for corresponding European App. 11 87 1784.

*Primary Examiner* — Audrey K Bradley
*Assistant Examiner* — Jonathan Matthias
(74) *Attorney, Agent, or Firm* — WRB-IP LLP

(57) ABSTRACT

A method for regenerating an exhaust gas purification unit arranged in an internal combustion engine system includes setting a predefined minimum engine speed such that the exhaust gas mass flow exceeds a predefined flow value during the regeneration process. An internal combustion engine system including an exhaust gas purification unit adapted to be operated according to the method is also provided.

11 Claims, 2 Drawing Sheets

(56) References Cited

U.S. PATENT DOCUMENTS

2006/0117740 A1* 6/2006 Okugawa et al. ............... 60/285
2007/0251220 A1* 11/2007 Dawson et al. ................. 60/295
2009/0099758 A1* 4/2009 Guo et al. ..................... 701/108

FOREIGN PATENT DOCUMENTS

| JP | H082280 A | | 1/1996 | |
| JP | 2004044722 A | * | 2/2004 | ............. F16H 61/20 |
| WO | 2005019616 A1 | | 3/2005 | |

* cited by examiner

METHOD AND SYSTEM FOR REGENERATING AN EXHAUST GAS PURIFICATION UNIT

The present application is a continuation of U.S. application Ser. No. 12/304,759, filed Dec. 13, 2008, which is the U.S. National Stage of PCT/SE2006/000730, filed Jun. 14, 2006, both of which are incorporated by reference.

BACKGROUND AND SUMMARY

This invention relates to a method for regenerating an exhaust gas purification unit arranged in an internal combustion engine system. In particular, the invention relates to a method for regenerating a diesel particulate filter in a vehicle engine system in low-load or idling situations. The invention also relates to an internal combustion system adapted to be operated according to the method.

Exhaust gas from internal combustion engines contains hazardous compounds in the form of hydrocarbons (HC), carbon monoxide (CO), nitrogen oxides (NOx) and/or particulate matter (PM). The exhaust gas is therefore normally led through an after-treatment system adapted to purify the exhaust gas. Such systems include for instance catalytic converters, NOx-traps and particle filters. Exhaust gas after-treatment components normally need to be operated within a certain temperature interval; if the temperature is too low the desired chemical reactions do not take place or the reaction rate becomes too low, and if the temperature is too high the components might be destroyed. Further, some components, such as NOx-traps and particle filters, need to be regenerated at a certain interval in order to work properly. Such regenerations are normally carried out at an increased temperature level.

With regard to internal combustion engines in vehicle applications the physical and chemical properties of the exhaust gas leaving the engine mainly depend on the type of engine and the conditions under which the vehicle is run. For instance, diesel engines generally produce larger amounts of particles and a cooler exhaust gas than an Otto-engine. Further, an engine that runs under high-load conditions generates exhaust gas with a much higher temperature than an idling engine. In order to perform a regeneration process, it may be necessary to take particular actions in the after-treatment system to further increase the temperature.

The exhaust gas properties of an engine operated at a high load for a longer time, such as an engine of a truck used for road transports, are normally suitable for regeneration purposes. However, a typical example where unfavourable exhaust gas properties causes problem in the after-treatment system is cleaning of the diesel particle filter of a refuse removal truck. In such a vehicle application, significant time is spent on idle speed with short, intermittent and limited driving distances, resulting in a relatively cool exhaust gas. To clean such a filter by injecting fuel and burning the particles, the temperature of the exhaust gas leaving the engine should normally be at least around 250° C.

A known way of increasing the temperature of the exhaust gas leaving the engine is to increase the amounts of fuel injected to the engine cylinders or to delay the injection (post-injection). A sufficiently high temperature is, however, normally not reached with such a measure alone.

With regard to regeneration of particle filters in low-load or idling situations a known method is to use a separate burner for heating up the filter. This is, however, a rather complicated solution since it requires additional equipment such as the burner itself and an air compressor.

US2005/0148430 discloses a method for increasing the exhaust gas temperature during low-load or idling operation wherein the engine load is increased by activating a brake and/or a starting element, such as a clutch or a torque converter. However, this method is not applicable in all situations since the parameters'affecting the exhaust gas properties are not fully considered.

It is desirable to provide a method and system for regeneration of a purification unit, which method and system create improved regeneration conditions in low-load or idling situations compared to known solutions.

An aspect of the invention concerns a method for regenerating an exhaust gas purification unit arranged in an internal combustion engine system, and the an aspect of the invention is characterized in that the method comprises the step of: setting a predefined minimum engine speed such that the exhaust gas mass flow exceeds a predefined flow value during the regeneration process.

An aspect of the inventive method has the advantageous effect of avoiding regeneration of the purification unit in situations wherein the purification unit may be destroyed if subjected to regeneration because of a too low exhaust gas mass flow. For instance, a conventional diesel particulate filter is likely to be destroyed by overheating if regenerated when the exhaust gas mass flow is below a certain level. Moreover, the inventive method has the advantageous effect of establishing suitable conditions for initiating or maintaining regeneration of the purification unit in situations where the exhaust mass flow is too low, such as in low-load or idling situations. The use of a minimum engine speed for ensuring that the exhaust gas mass flow becomes sufficient is useful regardless of whether any special actions are taken to increase or control the exhaust gas temperature.

In a preferred embodiment of an aspect of the invention the method also comprises the step of setting a predefined minimum engine torque such that the exhaust gas temperature exceeds a predefined temperature value during the regeneration process. A regeneration process can in such a case be performed when required, i.e. it is not necessary to delay the start of, or to interrupt, the regeneration because of an unfavourable exhaust gas mass flow or temperature.

In a further preferred embodiment of an aspect of the invention, the predefined minimum engine speed and the predefined minimum engine torque are set in combination such that the exhaust gas mass flow exceeds a predefined flow value and the exhaust gas temperature exceeds a predefined temperature value during the regeneration process. This reflects e.g. a case where a change of the engine speed has a direct effect on the engine torque, such as when a hydraulic torque converter is connected to the engine. In addition, any influence of the engine speed to the exhaust gas temperature, and of the engine torque to the exhaust gas mass flow, can thereby be taken into account.

In a further preferred embodiment of an aspect of the invention, the method further comprises one or several of the following steps: determining whether a regeneration of said exhaust gas purification unit is required, determining the exhaust gas temperature, and performing regeneration of said exhaust gas purification unit in case the exhaust gas mass flow exceeds said predefined flow value.

In a further preferred embodiment of an aspect of the invention, the engine system comprises an internal combustion engine; a gearbox; a starting element arranged to connect the engine and the gearbox, said starting element being capable of slipping; and a braking element capable of increasing the engine load when activated, wherein the method further comprises the steps of: activating the braking element, determining whether a gear is engaged and, if that is not the case, engaging a gear. This reflects the typical case where a refuse removal truck equipped with a hydraulic torque converter and an automatic gearbox operates in a low-load situation.

An aspect of the invention also concerns an internal combustion engine system comprising an exhaust gas purification unit, wherein the system is adapted to be operated according to the method described above.

BRIEF DESCRIPTION OF DRAWINGS

In the description of the invention given below reference is made to the following figure, in which.

DETAILED DESCRIPTION

Figure 1:
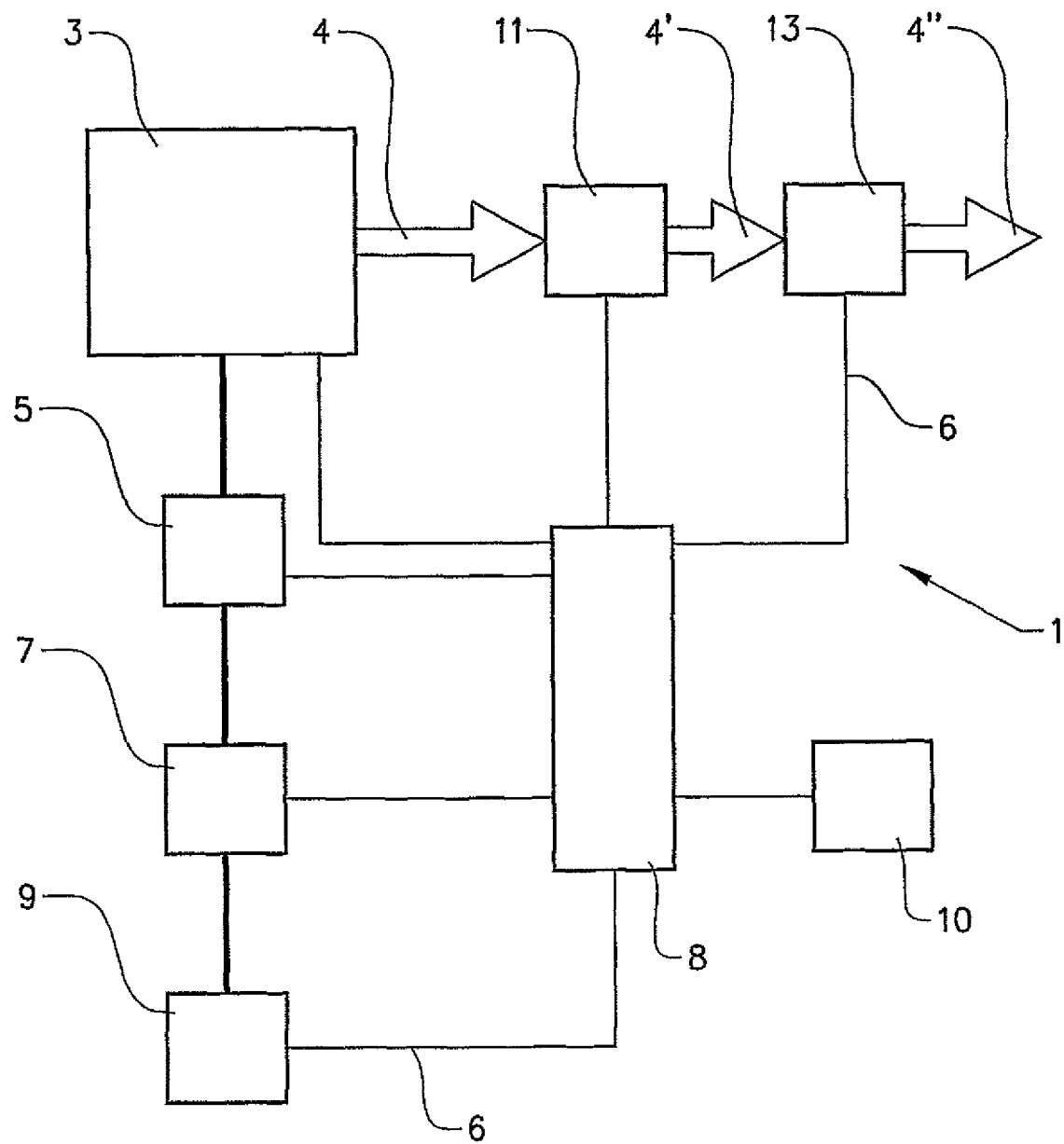
FIG. 1 shows, in a schematic view, an example of an engine system to which the inventive method can be applied.

FIG. 1 shows a schematic example of an internal combustion engine system 1 arranged on a vehicle (not shown) to which system 1 the inventive method can be applied. The engine system 1 comprises a heavy-duty diesel engine 3 that is connected to starting element 5 in the form of a hydraulic converter that in turn is connected to an automatic transmission gearbox 7 as to drive a driving unit 9 in the form of a drive shaft of a truck. The engine 3 generates a flow of exhaust gas 4 that passes a diesel oxidation catalyst (DOC) 11 and a diesel particulate filter (DPF) 13 before it is emitted to the environment. The DOC 11 catalytically oxidizes NO (nitrogen oxide), hydrocarbons (HC) and soot particles under the production of heat. Remaining particles are trapped in the DPF 13. In this example, the DPF 13 is of a conventional type containing a number of channels divided by ceramic, porous walls through which the flow of exhaust gas is forced. As the amounts of trapped particles increase in the DPF 13, the pressure drop over the DPF 13 increases. To avoid a too large pressure drop over the DPF 13 it is, after some time, necessary to regenerate the filter by burning the particles.

A control unit 8 is electronically connected to the various components of the engine system 1 in order to receive data on their status and to control their operation. These electronic connections are indicated by lines 6. The system 1 further comprises a number of sensors (not shown) for determining system parameters, such as engine speed, engine load, engine temperature, engine air intake, exhaust gas temperature, exhaust gas composition (e.g. oxygen content) and pressure drop over the DPF 13. Also these sensors are connected to the control unit 8. The control unit 8 comprises software, processor, memory etc. as to be capable of analyzing the received data and of sending adequate operation instructions to the various components of the system 1. The control unit 8 is further connected to the braking system 10 of the vehicle, including both the parking brake and the service brake. In the schematic view of the engine system 1 shown in FIG. 1 the control unit 8 is shown only as a single box. In reality, the control unit 8 may for instance comprise a central vehicle control unit communicating with e.g. an engine control unit and a transmission control unit.

In order to perform a successful regeneration of the DPF 13 it is important that the exhaust gas temperature is sufficiently high for performing an effective regeneration process, and that the temperature in the DPF 13 is kept below a certain upper level, around 9000 C, above which the DPF 13 may be destroyed due to overheating. To avoid exceeding this upper level it is important that the exhaust gas mass flow is sufficient because this flow is used for cooling purposes. In the example shown in FIG. 1 the required minimum mass flow of the exhaust gas leaving the engine is 0.08 kg/s. Further, the target temperature of the exhaust gas entering the DPF 13, i.e. the flow 4' in FIG. 1, is 6000 C. The temperature of the exhaust gas entering the DOC 11, i.e. the flow 4 in FIG. 1, is normally lower. To increase the temperature of the gas flow 4' leaving the DOC 11, fuel (HC) is added to the DOC 11 resulting in generation of heat in the oxidation process in the DOC 11. In this example the target temperature of the exhaust gas entering the DOC 11 is 2500 C. Provided that the exhaust gas leaving the engine 3 is not significantly cooled on its way to the DOC 11 the temperature of the exhaust gas entering the DOC 11 corresponds to the temperature of the exhaust gas leaving the engine 3.

It should be noted that the values given above regarding the required exhaust gas mass flow and the suitable exhaust gas temperatures are valid for the system exemplified in FIG. 1. The required minimum exhaust gas mass flow depends on the size and type of the DPF 13, which in turn depends on the size and type of the engine, and the suitable temperatures depend on the type of DPF 13 and on which exhaust gas after-treatment components that are included in the engine system. Other values may therefore be more adequate for other systems.

As follows from the above, a successful regeneration of a DPF requires an efficient control of the mass flow and the temperature of the exhaust gas leaving the engine. These two exhaust gas parameters can be controlled by varying the two engine parameters engine speed and engine torque (load). Generally, both these engine parameters affect both the mass flow and the temperature of the exhaust gas: An increase of the engine speed leads to a higher number of piston strokes per time unit and thus to a larger amount of exhaust gas per time unit, but it also leads to a higher exhaust gas temperature because of an increasing engine temperature (increased friction). An increase of the engine torque requires larger amounts of fuel and air to enter the cylinder in each piston stroke which leads to an increased combustion temperature, and thus to a higher exhaust gas temperature, but also to an increased exhaust gas mass flow due to the larger amounts of air and fuel used in each stroke. However, the engine speed has a much stronger effect on the exhaust gas mass flow than on the exhaust gas temperature, and, conversely, the engine torque has a much stronger effect on the exhaust gas temperature than on the exhaust gas mass flow.

For a given engine the exhaust gas mass flow is thus mainly dependent on the engine speed whereas the exhaust gas temperature that leaves the engine is mainly dependent on the engine torque. Accordingly, it is possible to control the exhaust gas mass flow, and partly the temperature, by varying the engine speed and to control the exhaust gas temperature, and partly the mass flow, by varying the engine torque. In a preferred embodiment of the invention the engine speed and the engine torque are controlled in combination such that the exhaust gas mass flow exceeds a predefined flow value and the exhaust gas temperature exceeds a predefined temperature value during the regeneration process.

The possibility of varying these two engine parameters independently of each other depends on the type of starting element 5 used to connect the engine 3 with the gearbox 7. If the starting element 5 is a hydraulic converter, as the system 1 described here, a given engine speed will result in a given engine torque. On the other hand, if the starting element 5 is a wet clutch it is possible to vary the engine speed and the engine torque independently of each other. In any case the starting element 5 should have slipping capability, i.e. it should be capable of slipping without significant mechanical wear.

Figure 2:
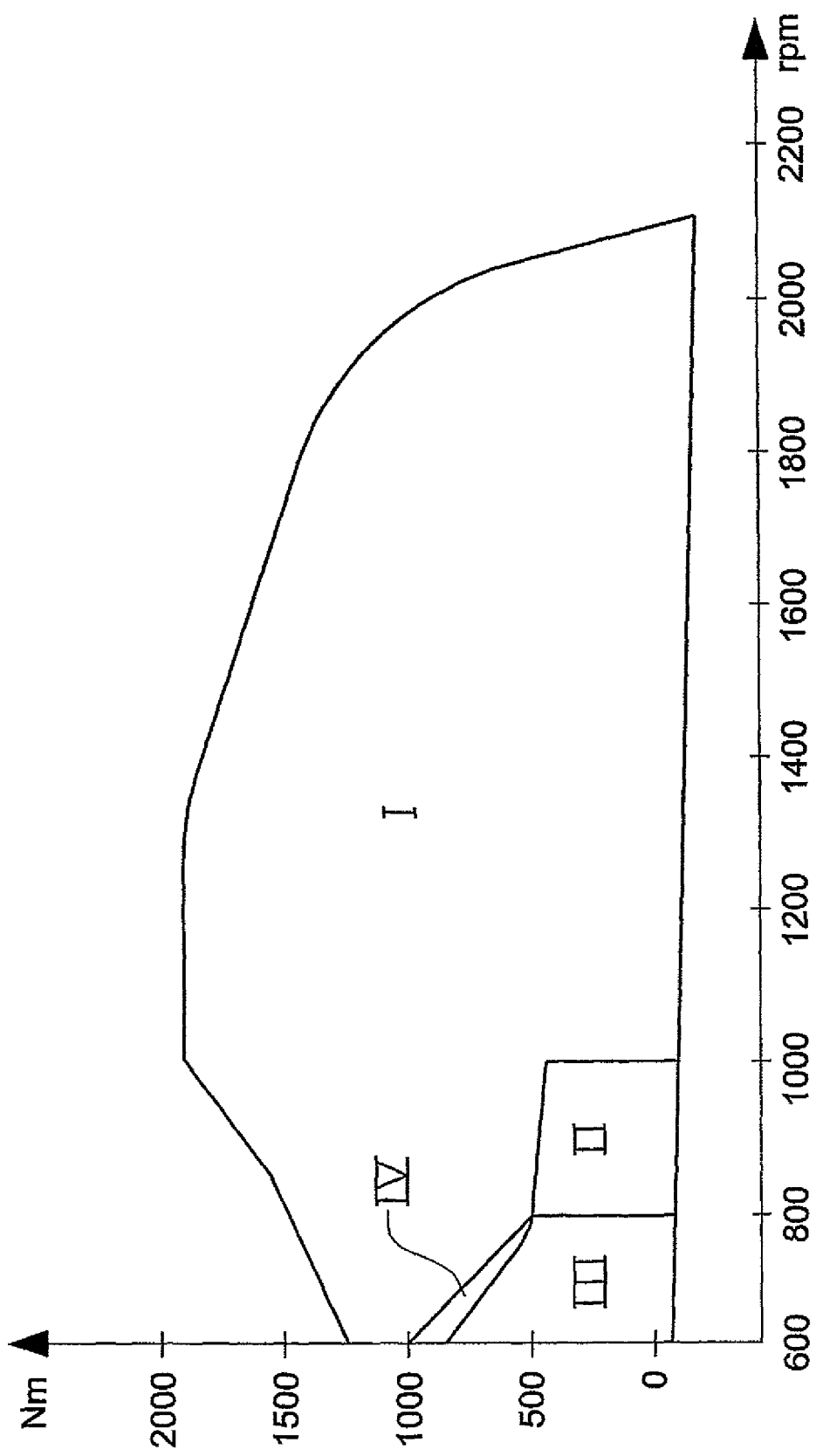
FIG. 2 shows an example of how the engine speed and the engine load influence the conditions for performing a regeneration of a diesel particulate filter (DPF).

FIG. 2 shows an example of how the engine speed and the engine load of a heavy-duty diesel engine influence the conditions for performing a regeneration of a DPF. The engine speed (in rpm) is given on the x-axis and the engine torque (in Nm) is given on the y-axis.

In region I both the engine speed and the engine load are sufficient to provide suitable conditions for performing regeneration of the DPF 13 with regard to exhaust gas mass flow and temperature. Typically, an engine of a road transport truck is operated within this region most of the time. In region II the temperature is too low for performing regeneration, whereas in region III both the mass flow and the temperature are too low. In region IV, the mass flow is too low, but the temperature sufficient, to perform a successful regeneration. Although the three regions II, III and IV are relatively small, a refuse collecting truck operates to a large deal within these regions.

If a regeneration of the DPF is performed when the engine parameters define a point of operation that lies within region IV, there is a considerable risk of destroying the filter, as described above. It is thus important to first adjust the engine parameters such that the operation point ends up within region I before starting the regeneration. If the regeneration is already ongoing, it is instead important to avoid that the operation point falls outside region I.

Starting from an operation point within region III, region I can in principal be reached by increasing either the engine speed or the engine load. However, increasing only the engine load, in order to reach a certain minimum exhaust gas temperature, without considering the exhaust gas mass flow might result in that the mass flow remains too small for a successful regeneration, i.e. the operation point ends up in region IV. As can be seen in FIG. 2, a suitable operation point for carrying out regeneration in this example is achieved by keeping the engine speed at 800 rpm or higher and the engine load at 500 Nm or higher.

Conventionally, regeneration of a DPF is controlled in such a way that it is allowed to start, or continue, on the condition that the exhaust gas temperature is sufficiently high. If the temperature is, or falls, below a certain level the regeneration process is not allowed to start, or is interrupted. To increase the exhaust gas temperature it is known to e.g. apply a load to the engine, as described in US2005/0148430. Although the method proposed in US2005/0148430 may be suitable in certain situations, no considerations are made to the importance of the magnitude of the exhaust gas mass flow. As mentioned above, increasing the load without considering the exhaust gas mass flow might result in a too small mass flow leading to an overheated filter. Where the exhaust gas mass flow has been considered in conventional regeneration methods, the solution appears to have been to monitor the exhaust gas mass flow and to interrupt the regeneration when the mass flow becomes too low.

The fundamental idea of this invention is to bring about suitable conditions for performing a regeneration of a purification unit, such as a DPF, with regard to exhaust gas temperature and, in particular, exhaust gas mass flow, by adjusting the engine speed or a combination of the engine speed and the engine torque.

With regard to the engine system 1 shown in FIG. 1, an example of the inventive method can be described in the following way: Firstly, the pressure drop sensor informs the control unit 8 that a regeneration of the DPF 13 is needed. At this point, the control unit 8 determines the conditions for performing a regeneration, i.e. it checks for instance the exhaust gas mass flow and temperature, whether a gear is engaged, whether any of the service or parking brakes 10 are activated, and whether the vehicle moves or not. If the conditions are suitable, the control unit 8 sets a minimum engine speed to a predefined value corresponding to a minimum exhaust gas mass flow of 0.1 kg/s. Due to the inherent speed-load characteristics of the hydraulic converter 5, this predefined minimum engine speed value results in a certain minimum engine torque value that ensures that the exhaust gas temperature will be sufficient. This temperature is thus equal to, or exceeds, a minimum temperature limit for carrying out the regeneration. Further, the control unit 8 determines whether the engine speed needs to be increased to reach the predefined minimum value. If so, the control unit 8 sends this operational request to the engine 3. When the engine speed equals or exceeds its predefined minimum value, the control unit 8 initiates the regeneration, i.e. the control unit 8 initiates the injection of fuel into the DOC 11.

Because a minimum engine speed is set in the inventive method, there is no risk that the regeneration is started while there is a too low exhaust gas mass flow, or that the exhaust gas mass flow will fall below the minimum exhaust gas mass flow during the regeneration process.

With regard to the described engine system 1, an increase of the engine speed, and thus the torque, normally results in that the vehicle starts to move, or moves faster, provided that a gear is engaged. By activating the brakes 10 the increased torque will instead be taken up in the hydraulic converter 5 which is capable of slipping without wear.

The inventive method is in particular suitable for being used in vehicles equipped with automatic transmission and a hydraulic torque converter, which is typical for vehicle applications with a lot of stop and go, such as refuse type vehicle applications. A benefit with automatic transmissions with hydraulic torque converter is that it is possible to apply torque to the engine at stand still which will increase temperatures in the exhaust system. Typically the load on a 13-liter heavy-duty diesel engine at 600 rpm is 400 Nm at standstill when a gear is engaged (compared to a disengaged dry clutch system with almost no load on the engine at standstill). A limited increase of engine speed will increase engine load significantly, which will result in even more increased exhaust gas temperatures.

Examples of the inventive method can also be described in the form of cases:

Case 1 Conditions: Vehicle at stand still, park brakes engaged, gear engaged, regeneration of DPF requested 1. The engine speed is set to a predefined minimum value which results in a minimum mass flow that allows start of DPF re-generation. A typical engine set point speed for a heavy-duty diesel engine is 800 rpm.

2. The start element is controlled so that the engine load (torque) is above a predefined value. A typical engine load for a heavy-duty diesel engine is 500 Nm.

If the start element is not possible to control, as is the case for e.g. a hydraulic converter, the engine speed is controlled such that both the engine load and the engine speed are in a region (see FIG. 2) where it is possible to re-generate the DPF.

Case 2 Conditions: Vehicle is running at a low speed, service brakes are engaged in order to reduce vehicle speed, gear engaged, re-generation of DPF requested or on-going 1. The minimum engine speed is set to a predefined value that results in a minimum mass flow which allows start of DPF re-generation. A typical engine set point speed for a heavy-duty diesel engine is 800 rpm. The engine speed will not fall below this predefined value even if the vehicle comes to stand still.

2. If the vehicle comes into stand still, the engine speed will not fall below the predefined value set in the previous step—regeneration can continue, as long as a gear is engaged and any of the brakes 10 activated.

Case 3 Conditions: Vehicle at standstill, park brakes engaged, re-generation of DPF is requested 1. The driver manually activates a re-generation, for instance via a push button on the dashboard.

2. Gear is engaged.

3. Steps 1 and 2 of example 1 are used.

Case 4 Conditions: Vehicle is running at a high speed, gear engaged, re-generation of DPF requested or on-going 1. The minimum engine speed is set to a predefined value that results in a minimum mass flow which allows start of DPF re-generation. A typical engine set point speed for a heavy-duty diesel engine is 800 rpm. The engine speed will not fall below this predefined value even if the vehicle comes to stand still.

2. If the vehicle comes into stand still, the engine speed will not fall below the predefined value set in the previous step—regeneration can continue, as long as a gear is engaged and any of the brakes 10 activated.

The cases are finished when the regeneration is completed. Case 4 applies also to e.g. a road transport truck which comes into stand still, for instance due to a traffic jam or to that the driver needs a break.

In terms of method steps, the inventive method for controlling the engine system 1 in connection with regeneration of the DPF 13 can include the following:
- determining whether a regeneration of the DPF 13 is required
- determining the exhaust gas temperature—determining whether the exhaust gas temperature is lower than, or exceeds, a predefined minimum temperature value
- determining the exhaust gas mass flow
- determining whether the exhaust gas mass flow is lower than, or exceeds, a predefined minimum flow value
- determining whether the vehicle is running or at stand still
- determining whether the vehicle parking and/or service brakes 10 are engaged
- determining whether a gear is engaged
- activating brakes 10 if not activated
- engaging a gear if not engaged and if brakes 10 are activated
- determining the engine speed
- determining the engine load
- determining whether the engine speed is lower than, or exceeds, the predefined minimum value
- setting the engine speed to the predefined minimum speed value
- increasing the engine speed, and thus the torque, such that the exhaust gas temperature exceeds the predefined temperature value
- performing (initiating/maintaining) regeneration of the DPF 13 when the exhaust gas mass flow and the exhaust gas temperature exceed said predefined flow and temperature values The inventive method is also applicable to other types of filters and other purification units and to combinations of a DPF and another purification unit. Further, as an alternative to the process of adding fuel to the DOC 11, other types of regeneration processes may be utilized, such as so-called passive regeneration wherein nitrogen oxides react with soot particles in the filter.

In a preferred embodiment of the invention the required minimum engine torque/exhaust gas temperature is adjusted depending on ambient temperature that in particular affects the temperature of the DPF but also the exhaust gas temperature. If the ambient temperature is low, a higher exhaust gas temperature might be required during regeneration.

The invention is not limited by the embodiments described above but can be modified in various ways within the scope of the claims. For instance, all the method steps given above are not necessary for the invention. For instance, it is not needed to explicitly determine the exhaust gas mass flow. Instead it can be used that the exhaust gas mass flow approximately corresponds to a certain engine speed in a certain system. Thus, the exhaust gas mass flow can be indirectly determined by determining a representation of the exhaust gas mass flow, i.e. the engine speed.

Moreover, if the engine system 1 comprises a wet clutch instead of the hydraulic converter as starting element 5 it is possible to control the engine load independently of the engine speed. In such a case, a separate method step can be to set the engine load to a predefined minimum load value such that the exhaust gas temperature exceeds the predefined temperature value.

In another alternative the engine 3 can drive a hydraulic motor instead of the hydraulic converter 5. In such a case, the hydraulic motor can be considered to form the starting element 5. In still another alternative the engine 3 drives a so-called ISAD and/or an electrical machine instead of the hydraulic converter 5, which ISAD and/or electrical machine in such a case can be considered to form the starting element 5.

It should also be mentioned that it is not necessary that the determination whether a regeneration of the DPF 13 is required is carried out by using a pressure drop sensor.

If the inventive method is applied to an engine system that is not arranged in a vehicle, the service or parking brakes 10 could be substituted for another type of braking element capable of increasing the engine load when activated.

The invention claimed is:

1. Internal combustion engine system comprising an engine, a gearbox, and a hydraulic torque converter arranged to connect the engine and the gearbox, an exhaust gas purification unit, and a control unit configured to control a method for regenerating the exhaust gas purification unit, wherein the method comprises:
   setting a predefined minimum engine speed and a predefined minimum engine torque in combination such that an exhaust gas mass flow exceeds a predefined flow value and an exhaust gas temperature exceeds a predefined temperature value during a regeneration process;
   operating the engine at least at the predefined minimum engine speed so that the exhaust gas mass flow exceeds the predefined flow value; and
   while operating the engine at least at the predefined minimum engine speed, providing an activation of the hydraulic torque converter and thereby increasing engine load independently of engine speed such that exhaust gas temperature exceeds the predefined temperature value.

2. System according to claim 1, wherein the hydraulic torque converter is capable of slipping, and the system comprises a braking element capable of increasing the engine load when activated, wherein the method that the control unit is arranged to perform comprises:
- activating the braking element,
- determining whether a gear is engaged and, if that is not the case,
- engaging a gear.

3. System according to claim 1, wherein that the exhaust gas purification unit is a diesel particulate filter (DPF).

4. System according to claim 1, wherein the system is arranged on a vehicle for the purpose of propelling the vehicle.

5. System according to claim 4, wherein the vehicle is a truck intended for collecting refuse.

6. System according to claim 1, wherein the predefined flow value and the predefined temperature are a flow value and a temperature, respectively, at which a normal, successful regeneration of the exhaust gas purification unit is carried out.

7. Method for regenerating an exhaust gas purification unit arranged in an internal combustion engine system, the system comprising an internal combustion engine, a gearbox, and a hydraulic torque converter arranged to connect the engine and the gearbox, wherein the method comprises:
- setting a predefined minimum engine speed and a predefined minimum engine torque in combination such that an exhaust gas mass flow exceeds a predefined flow value and an exhaust gas temperature exceeds a predefined temperature value during, a regeneration process;
- operating the engine at least at the predefined minimum engine speed so that the exhaust gas mass flow exceeds the predefined flow value; and
- while operating the engine at least at the predefined minimum engine speed, providing an activation of the hydraulic torque converter, the hydraulic torque converter forming part of the engine system, and thereby increasing engine load independently of engine speed such that exhaust gas temperature exceeds the predefined temperature value.

8. Method according to claim 7, wherein the method further comprises one or several of the following steps:
- determining whether a regeneration of the exhaust gas purification unit is required,
- determining the exhaust gas temperature,
- performing regeneration of the exhaust gas purification unit in case the exhaust gas mass flow exceeds the predefined flow value 9. Method according to claim 7, wherein the hydraulic torque converter is capable of slipping and the system comprises a braking element capable of increasing the engine load when activated, wherein the method further comprises the steps of:
- activating the braking element,
- determining whether a gear is engaged and, if that is not the case,
- engaging a gear.

10. Method according to claim 7, wherein the exhaust gas purification unit is a diesel particulate filter (DPF).

11. Method according to claim 7, wherein the predefined flow value and the predefined temperature are a flow value and a temperature, respectively, at which a normal, successful regeneration of the exhaust gas purification unit is carried out.

\* \* \* \* \*

UNITED STATES PATENT AND TRADEMARK OFFICE
CERTIFICATE OF CORRECTION

PATENT NO. : 9,027,327 B2  Page 1 of 1
APPLICATION NO. : 12/761517
DATED : May 12, 2015
INVENTOR(S) : Niclas Johnson It is certified that error appears in the above-identified patent and that said Letters Patent is hereby corrected as shown below:

On the Title Page, Item (73) "Volvo Lasivagnar AB" should be spelled as --Volvo Lastvagnar AB--.

Signed and Sealed this
Eleventh Day of August, 2015

Michelle K. Lee
*Director of the United States Patent and Trademark Office*